Sept. 16, 1958    J. W. JACOBS    2,851,865
VEHICLE REFRIGERATING APPARATUS
Filed Nov. 29, 1954    3 Sheets-Sheet 2

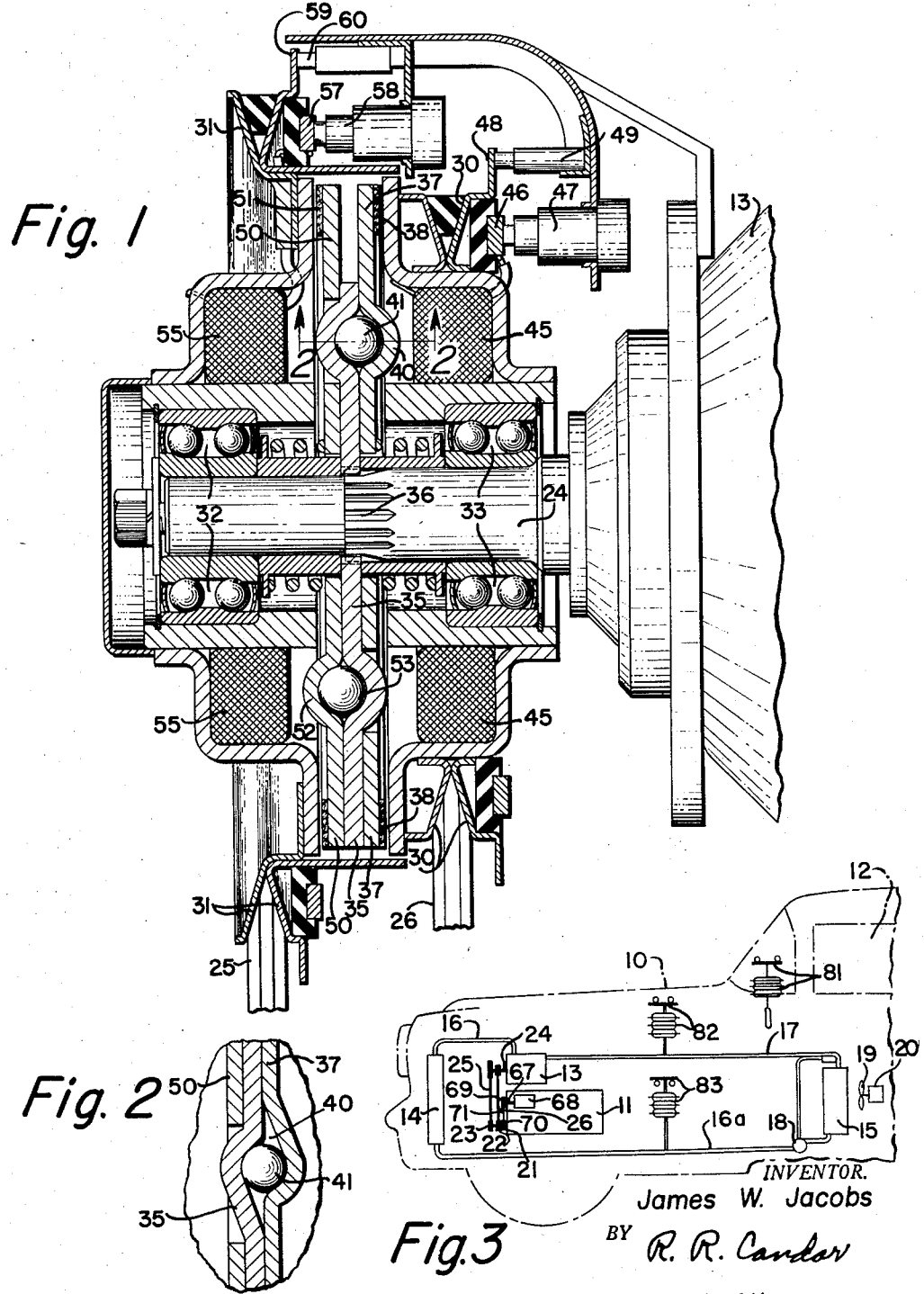

INVENTOR.
James W. Jacobs
BY R. R. Condor
His Attorney

INVENTOR.
James W. Jacobs
BY
R. R. Candor
His Attorney

United States Patent Office 2,851,865
Patented Sept. 16, 1958

2,851,865
VEHICLE REFRIGERATING APPARATUS

James W. Jacobs, Dayton, Ohio, assignor to General Motors Corporation, Detroit, Mich., a corporation of Delaware Application November 29, 1954, Serial No. 471,626

7 Claims. (Cl. 62—213)

This invention relates to refrigerating apparatus and more particularly to air conditioning apparatus for an automobile or the like.

An object of this invention is to provide an automobile with an air conditioning system having a compressor driven at varying ratios with respect to the speed of the automobile engine.

Another object of this invention is to provide an air conditioning system for an automobile having a compressor driven by a two-speed clutch from the automobile engine, and also being controlled in accordance with conditions on the vehicle such as the speed of the engine, refrigerant pressures, and/or air temperature in the space being conditioned.

Another object of this invention is to provide an improved clutch adapted to drive a compressor from an automobile engine or the like at varying speed ratios with respect to the engine speed.

Further objects and advantages of the present invention will be apparent from the following description, reference being had to the accompanying drawings wherein a preferred form of the invention is clearly shown.

In the drawings:

Figure 1 is a vertical cross-section of the clutch.

Figure 2 is a section taken along the line 2—2 of Figure 1.

Figure 3 is a diagrammatic representation of an automobile provided with an air conditioning system.

Figure 4:
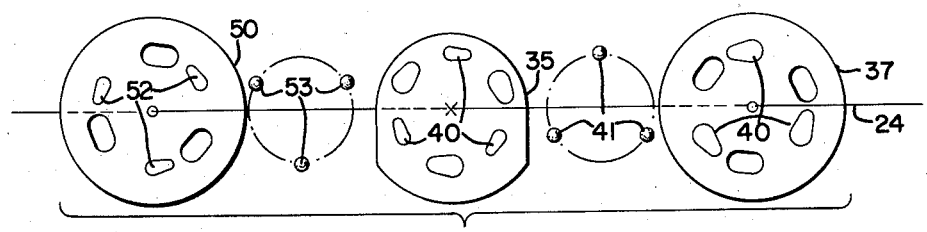
Figure 4 is a diagrammatic exploded view of the disks in the clutch shown in Figure 1.

An automobile or other vehicle 10 may be provided with an engine 11 for driving the vehicle and other parts thereon. The automobile may have a space 12 to be cooled by a refrigerating system on the vehicle which includes a compressor 13, condenser 14 and evaporator 15 in refrigerant flow relationship through the pipes 16, 16a and 17 and thermostatic expansion valve 18. The evaporator 15 may cool the space 12, as by having the air for said space blown through it by the fan 19 driven by the motor 20.

The engine 11 may have a drive shaft 21 provided with pulleys 22 and 23. The compressor 13 may have a compressor driven shaft 24 which is driven by belting 25 and 26 which drives the variable speed ratio clutch shown in Figure 1, which in turn drives the compressor 13.

The clutch on the compressor shaft 24 has a high-speed ratio clutch pulley 30 and a low-speed ratio clutch pulley 31, both freely rotatable on the shaft 24 through the medium of ball bearings 32 and 33. A clutch driven member or disk 35 is fixed on the compressor shaft 24 through the medium of spline 36. A high-speed clutch driving member or disk 37 is engageable with the high-speed clutch pulley 30 through the medium of a friction surface 38. The said member 37 is also engageable with the clutch driven member 35 through the medium of teardrop depressions 40 and balls 41 which are adapted to have a wedging action for driving the compressor when the member 37 is brought into engagement with the pulley 30. An annular high-speed clutch solenoid 45 is mounted within the pulley 30 and is adapted to pull the member 37 rightward when the solenoid is energized. The clutch solenoid may be energized through the medium of a contact ring 46 which is engaged by a brush 47 and by another ring 48 engaged by the brush 49.

A low-speed clutch driving member or disk 50 is engageable with the low-speed clutch pulley 31 through the medium of friction surface 51 and with the clutch driven member 35 through the medium of teardrop depressions 52 and balls 53 which produce a wedging action for driving the compressor. An annular low-speed clutch solenoid 55 causes engagement of the low-speed clutch driving member 50 with the low-speed pulley 31 by magnetic attraction. The solenoid 55 is energized through the medium of contact ring 57 which is engaged by the brush 58 and with the contact ring 59 which is engaged by the brush 60.

Figure 5:
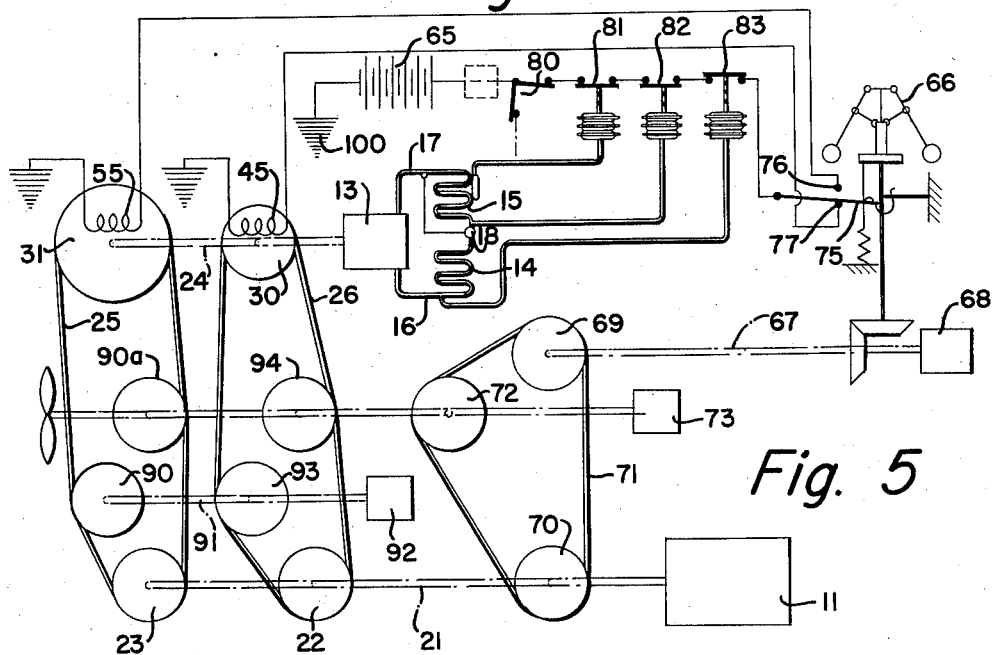
Figure 5 is a diagrammatic representation of the automobile engine and certain parts driven thereby.

An electric source such as the usual battery 65, in Figure 5, is provided on the vehicle. This electric source is adapted to energize the solenoids 45 and 55 through various controls. For example, a centrifugal switch 66 may be driven in response to engine speed as from the shaft 67 of the power steering pump 68 which is driven by the pulley 69 connected to the engine pulley 70 through the medium of belting 71 which also drives the pulley 72 for the water pump 73. The centrifugal switch 66 operates the snap switch 75 into engagement with the low-speed contact 76 or the high-speed contact 77 for energizing the solenoids 55 and 45 respectively. The switch 75 may receive its electric energy from the electric source 65 through wiring which contains, in series, a manual switch 80 for selecting operation or non-operation of the air conditioning system, a thermostat switch 81 responsive to the temperature of the space 12 being conditioned, a low-pressure switch 82 which opens the line when the refrigerant pressure in the evaporator 15 falls below a predetermined pressure, and a high pressure refrigerant switch 83 which opens the line when the refrigerant pressure in the condenser 14 rises above a predetermined pressure.

The belt 25 may also pass over a pulley 90 on the shaft 91 which drives the generator 92 and a pulley 90a on the water pump shaft. The belt 26 may pass over a pulley 93 also mounted on the shaft 91 and the pulley 94 mounted on the water pump shaft.

Figure 6:
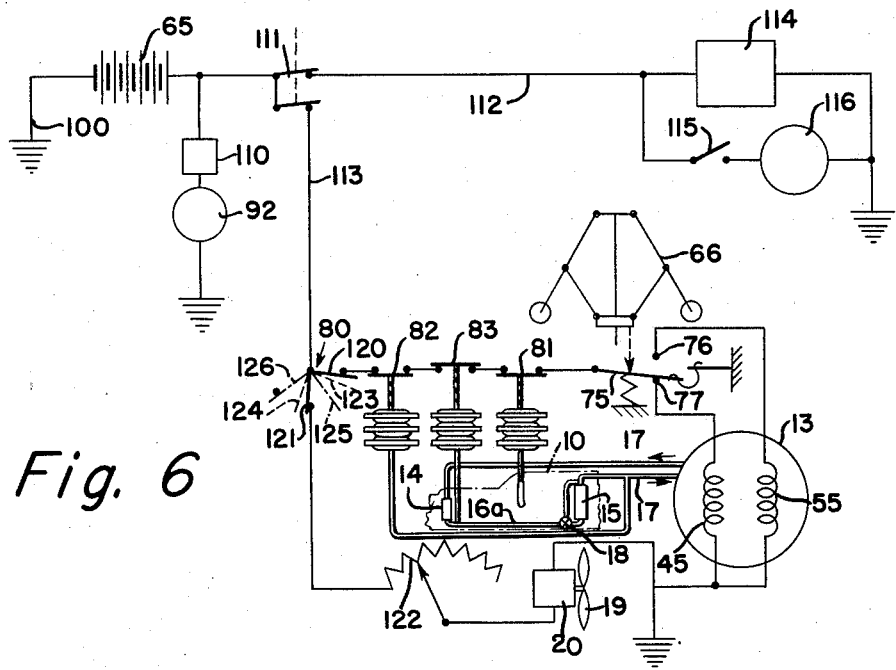
Figure 6 is a wiring diagram of one modification for controlling the clutch.

In Figure 6, the wiring diagram of Figure 5 is further developed by showing the wiring connections with other parts of the vehicle. For example, the battery 65 is grounded at 100. It is charged by the generator 92 through the medium of the current and voltage regulator and cutout relay 110. A combined air conditioning and ignition switch 111, when closed, energizes the lines 112 and 113. The line 112 leads to the ignition system 114 and to the starter switch 115, which when closed energizes the starter 116.

The air conditioning line 113 may be connected to the manual selective switch 80. This switch 80 is a three-position switch, having a refrigeration position, an off position and a ventilation position. To energize the air conditioning system with refrigeration, the blade 120 is in the full line position for energizing the compressor while the blade 121 is also in full line position for energizing the blower motor 20 through the medium of a speed controlling rheostat 122. The switch 80 may be moved to the off position with the blade 120 in the off position indicated by the dotted line 123 while the blade 121 moves to the position shown by the dotted line 124. The switch 80 may be moved to the ventilation position in which case the blade 120 moves to the dotted line position 125 while the blade 121 moves to the dotted position 126. The other elements shown in Figure 6, which are numbered identically with those shown in Figure 5, operate in substantially the same manner.

Figure 7:
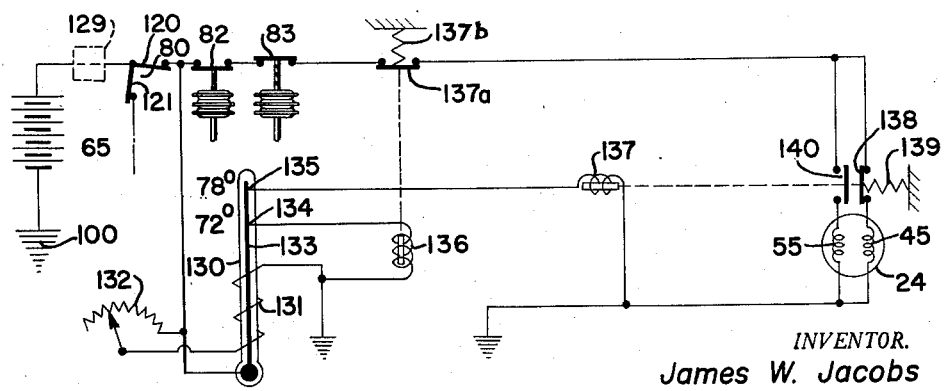
Figures 7 and 8 are wiring diagrams showing modifications of the control.

In the modification shown in Figure 7, the compressor control circuit of either Figures 5 or 6 may be modified, insofar as the thermostat action of thermostat 81 is concerned. It is understood that the other parts of the systems shown in Figures 5 and 6 which are omitted in Figure 7 may be used in the vehicle, as indicated by square 129.

A mercury thermostat 130 is placed in the space being conditioned in the vehicle, and it selects the energization of the solenoids 45 and 55 in response to space temperatures. A low capacity heater 131 heats the mercury thermostat 130 through the medium of adjustable rheostat 132. Adjustment of the rheostat 132 selects the temperature to be maintained in the space. The action of the heater 131 is such that the mercury 133 rises to the position shown at 134 when the space temperature reaches a selected low limit such as 72°, and when the mercury reaches the position 135 the space temperature reaches a selected high temperature such as 78°. When the space temperature is below 72°, and the mercury is below 134, no current is supplied to the solenoids 136 and 137. As the temperature rises to 72° or above, the mercury at 134 energizes the solenoid 136 and closes switch 137a against the action of compression spring 137b. This energizes one of the solenoids 45 or 55, depending upon the energization of solenoid 137. When the space temperature reaches 78° or above, the mercury energizes the solenoid 137 and this pushes the switch 138 to closed position against the action of compression spring 139. This energizes the high-speed solenoid 45, so that the compressor 24 is operated at a relatively high speed to provide more refrigeration for the purpose of reducing the temperature below 78°, if possible. When the temperature falls below 78°, the solenoid 137 is deenergized, and this allows the spring 139 to push the contact 140 to closed position and contact 138 to open position, in which case the low-speed solenoid 55 is energized to operate the compressor 25 at relatively slow speed which is suitable for maintaining the space between the temperatures 72° and 78°. When the temperature falls below 72°, refrigeration is stopped by the deenergization of solenoid 136 and the opening of switch 137a. If different limiting temperatures are desired, the rheostat 132 is adjusted to raise or lower the heat effect of heater 131 and this in turn modifies the limit temperatures to which the thermostat 130 is responsive.

Figure 8:
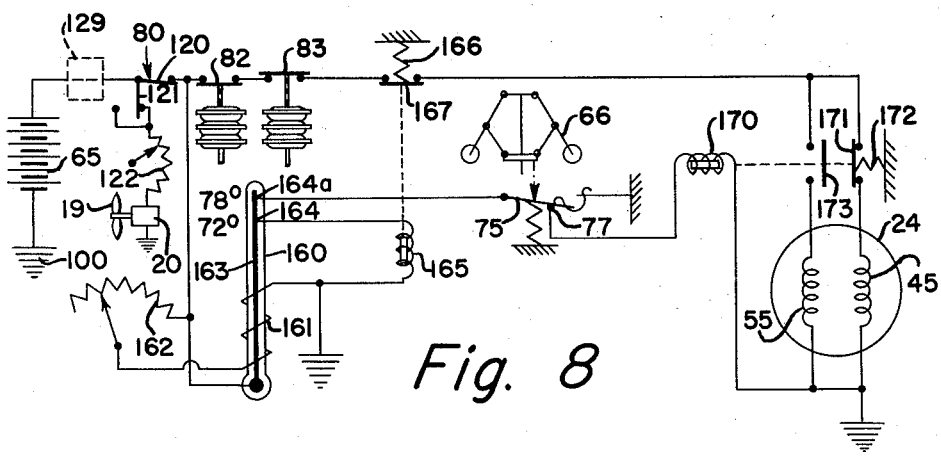

In the modification shown in Figure 8, the mercury thermostat 160 cooperates with the centrifugal switch 66 to control the solenoids 45 and 55. The heater 161 and rheostat 162 have substantially the same action as previously described with respect to Figure 7. The action is such that the compressor does not operate when the space temperature is below 72°. The compressor operates at low speed when the space temperature is above 72° and below 78°. The compressor operates at high speed ratio when the engine speed is low, and at low speed ratio when the engine speed is high while the space temperature is above 78°.

When the space temperature is below a selected low temperature of 72°, the mercury 163 is below the point 164, and the solenoid 165 is deenergized to allow the spring 166 to open the switch 167, under which conditions no refrigeration is supplied to the air conditioning system, since neither solenoid 45 nor 55 can be energized. When the space temperature rises above 72° but is below 78°, the mercury makes contact at 164 and energizes the solenoid 165 and this closes the switch 167 against the action of spring 166, to supply electric energy to the low speed ratio solenoid 55. The low speed solenoid is energized because the mercury has not reached the 78° temperature point 164a, and hence cannot energize the solenoid 170 regardless of engine speed. Hence the blade 173 is closed and blade 171 is opened by the action of compression spring 172. Under these conditions, the low speed clutch 55 is energized, regardless of engine speed.

When the space temperature rises to 78° or above, the mercury reaches contact 164a and current may or may not flow to solenoid 170, depending on the speed of the engine. When the engine is operating at low speed, the blade 75 contacts the high speed contact 77 and this in turn energizes the solenoid 170 to push the contact blade 171 to closed position against the action of compression spring 172. This energizes the high speed ratio solenoid 45. When the engine is operating at high speeds, the governor 66 moves the blade 75 away from the contact and deenergizes the solenoid 170. This permits the spring 172 to close the blade 173 and open blade 171, and this energizes the low-speed ratio solenoid 55 and operates the compressor 25 at relatively slow speed ratio, to prevent overspeeding the compressor regardless of the fact that space temperature is above 78°.

The switches 80, 82 and 83 shown in Figure 8, and other parts not shown in Figure 8, may have substantially the same operation as described with respect to Figures 4, 5 and 6.

While the form of embodiment of the invention as herein disclosed constitutes a preferred form, it is to be understood that other forms might be adopted as may come within the scope of the claims which follow.

What is claimed is as follows:

1. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; a compressor speed selection switch responsive to a condition of said vehicle and selectively connecting said high speed clutch solenoid and said low speed clutch solenoid to said electric source; and a refrigeration condition switch means in series with said speed selection switch.

2. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; a compressor speed selection switch responsive to a condition of said vehicle and selectively connecting said electric source to said high speed clutch solenoid and said low speed solenoid; and thermostatic switch means responsive to temperature conditions in said vehicle space in series with said speed selection switch.

3. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; a compressor speed selection switch responsive to a condition of said vehicle and selectively connecting said electric source to said high speed clutch solenoid and said low speed solenoid; and pressure switch means responsive to refrigerant pressure in said refrigerating system in series with said speed selection switch.

4. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; and thermostatic switch means responsive to high and lower temperature conditions in said vehicle selectively connecting said high speed and low speed clutch solenoids to said electric source.

5. In combination: a vehicle; an engine driving said vehicle; a vehicle space to be cooled on said vehicle; a refrigerating system on said vehicle and including a compressor, a condenser and evaporator in refrigerant flow relationship, with said evaporator cooling said vehicle space; compressor driving means between said engine and said compressor; a multiple speed ratio drive clutch on said compressor driving means; a plurality of solenoids selectively causing different speed ratio drives in said clutch; switch means responsive to different refrigeration conditions selectively energizing said solenoids, and means responsive to a predetermined refrigerant pressure in said refrigerating system for deenergizing said plurality of solenoids.

6. In combination: a vehicle; an engine driving said vehicle; a vehicle space to be cooled on said vehicle; a refrigerating system on said vehicle and including a compressor, condenser and evaporator in refrigerant flow relationship, with said evaporator cooling said vehicle space; a high speed compressor drive means and a low speed compressor drive means extending from said engine to said compressor, said drive means including high and low speed clutches, a thermostatic control means having a thermosensitive means responsive to the temperatures in said vehicle space, said thermostatic control means having means effective above a predetermined temperature to engage said high speed clutch and having means effective in a lower temperature zone for engaging said low speed clutch.

7. In combination: a vehicle; an engine driving said vehicle; a vehicle space to be cooled on said vehicle; a refrigerating system on said vehicle and including a compressor, condenser and evaporator in refrigerant flow relationship, with said evaporator cooling said vehicle space; a high speed compressor drive means and a low speed compressor drive means extending from said engine to said compressor, said drive means including high and low speed clutches, a thermostatic control means having a thermosensitive means responsive to the temperatures in said vehicle space, said thermostatic control means having means effective above a predetermined temperature to engage said high speed clutch and having means effective in a lower temperature zone for engaging said low speed clutch, and having means effective at temperatures below said lower temperature zone for disengaging both said high and low speed clutches.

References Cited in the file of this patent

UNITED STATES PATENTS

| | | |
|---|---|---|
| Re. 19,858 | Fehr | Feb. 18, 1936 |
| 577,050 | Mast | Feb. 16, 1897 |
| 2,094,449 | Forichon | Sept. 28, 1937 |
| 2,130,995 | Henny | Sept. 20, 1938 |
| 2,264,821 | Zukoski | Dec. 2, 1941 |
| 2,416,154 | Chilton | Feb. 18, 1947 |
| 2,449,888 | Edwards | Sept. 21, 1948 |
| 2,460,135 | Lehane et al. | Jan. 25, 1949 |
| 2,649,941 | Doebeli | Aug. 25, 1953 |
| 2,658,593 | Doebeli | Nov. 10, 1953 |
| 2,720,087 | Groene | Oct. 11, 1955 |
| 2,781,642 | Jacobs | Feb. 19, 1957 |